Sept. 9, 1958  W. W. WARREN  2,850,821
ANIMATED SUPPORT FOR ADVERTISING MATERIAL
Filed Oct. 4, 1954  3 Sheets-Sheet 1

INVENTOR.
William W. Warren
BY
ATTORNEY.

Sept. 9, 1958 W. W. WARREN 2,850,821
ANIMATED SUPPORT FOR ADVERTISING MATERIAL
Filed Oct. 4, 1954 3 Sheets-Sheet 2
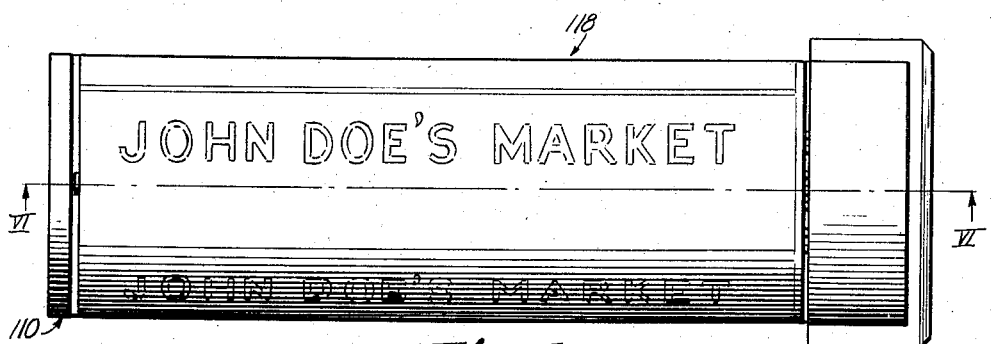
Fig. 5.
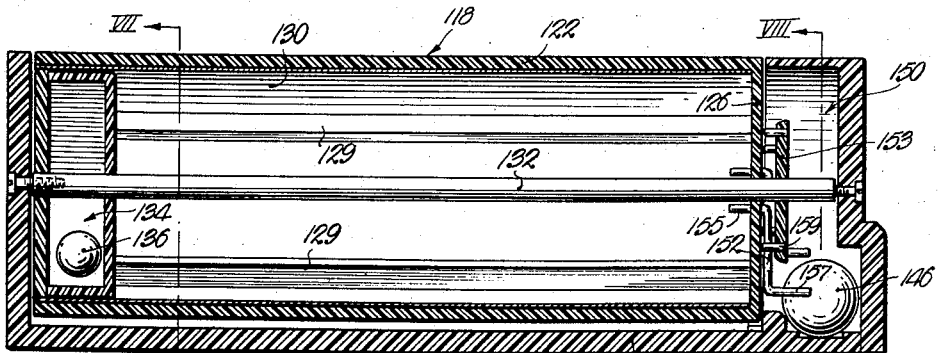
Fig. 6.
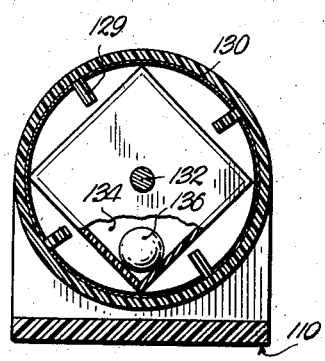
Fig. 7.
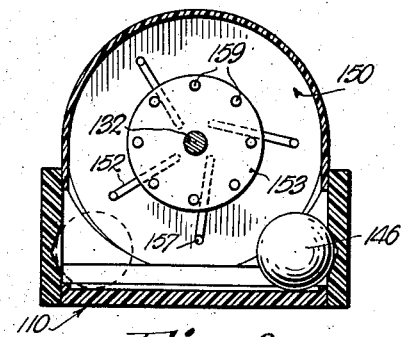
Fig. 8.
INVENTOR.
William W. Warren
BY
ATTORNEY.

Sept. 9, 1958 W. W. WARREN 2,850,821
ANIMATED SUPPORT FOR ADVERTISING MATERIAL
Filed Oct. 4, 1954 3 Sheets-Sheet 3

INVENTOR.
William W. Warren
BY
ATTORNEY.

United States Patent Office 2,850,821
Patented Sept. 9, 1958

2,850,821

ANIMATED SUPPORT FOR ADVERTISING MATERIAL

William W. Warren, Joplin, Mo., assignor to Action Devices, Inc., Kansas City, Mo., a corporation of Missouri Application October 4, 1954, Serial No. 459,911

1 Claim. (Cl. 40—68)

This invention has to do with animated apparatus operable automatically upon movement imparted to the support therefor and having many uses particularly in the field of advertising wherein it is desired to attract attention by virtue of a movement such as to periodically and successively expose different types of advertising material to the viewing public.

It is the most important object of the instant invention to provide an advertising device adapted for use especially with a moving object and operable automatically with no apparent connection with a prime mover and, therefore, more likely to attract attention because of its novelty and because of a creation of curiosity in the minds of the viewing public with respect to its manner of operation.

Another important object of this invention is to provide an advertising device having a movable part such as a rotatable drum or the like adapted to carry advertising material and motivated solely by operation of an inertia element which in turn obtains its power or force of movement from swinging, vibration or other movement of the support for the said drum and for the said inertia element.

A further object of this invention is to provide an animated device of the aforementioned character, utilizing steel balls or other spherical elements mounted to roll along a preselected path of travel with respect to a support in response to movement of an object upon which the support is mounted and operably coupled with the carrier for advertising material so as to advance the latter and successively expose lines of advertising material or the like to view.

A still further object of this invention is to provide advertising structure of an animated nature having a novel control operable in conjunction with the aforesaid spherical element to position the rotating drum or the like positively during each step-by-step movement thereof and to cooperate with the spherical element or elements in advancing the advertisement carrier to new positions each time the support is moved in a predetermined manner.

Other aims and objects include many important details of construction, all of which will be made clear as the following specification progresses, reference being had to the accompanying drawing, wherein:

Fig. 5 is a plan view of a modified form of animated support for advertising material made pursuant to the principles of the instant invention.

Fig. 6 is a longitudinal, vertical, cross-sectional view taken substantially on line VI—VI of Fig. 5.

Fig. 7 is a transverse, cross-sectional view taken on line VII—VII of Fig. 6 looking in the direction of the arrows.

Fig. 8 is a transverse, cross-sectional view taken on line VIII—VIII of Fig. 6 looking in the direction of the arrows.

Figure 1:
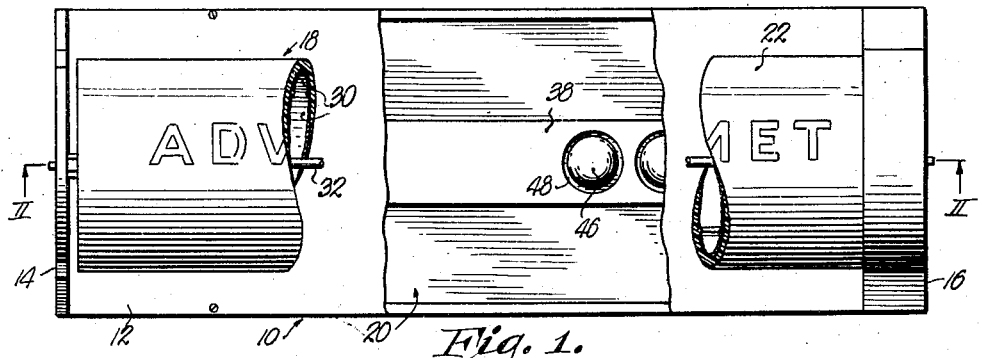
Figure 1 is a top plan view of an animated support for advertising material made pursuant to one form of the instant invention, parts being broken away to reveal details of construction.

In the embodiment illustrated by Figs. 1 to 4 inclusive, there is provided a support broadly designated by the numeral 10 and including a bottom wall 12, together with a pair of end walls 14 and 16. A carrier for advertising material broadly designated by the numeral 18 is mounted on the end walls 14 and 16 therebetween and above a shallow compartment 20 extending between the walls 14 and 16 above the bottom wall 12.

Carrier 18 includes an elongated, transparent or translucent cylinder 22 having end walls 24 and 26. A number of arcuate, circumferential notches 28 in the end wall 24 adjacent the cylinder 22, are adapted to clear a like number of advertising cards 30 that are slipped into place within the cylinder 22 along the innermost surface of the latter. A central shaft 32 extending longitudinally of the cylinder 22, through the end walls 24 and 26 thereof, rotatably mounts the carrier 18 on the end walls 14 and 16.

A polygonal cage 34 within the cylinder 22 adjacent the end wall 24 of the latter, receives weight 36 preferably in the nature of a spherical element such as a steel ball, it being noted that the shaft 32 traverses the cage 34.

An elongated arm 38 within the compartment 20 is pivotally mounted on the bottom wall 12 for swinging movement with respect thereto through the provision of a pintle 40 at one end of the arm 38 beneath the cage 34. A dimple 42 adjacent the opposite end of the arm 38 slides along the bottom wall 12 as the arm 38 swings on pintle 40, and the arm 38 also slides along a transverse bar 44 intermediate the ends of the arm 38 and rigid to bottom 12.

A plurality of inertia elements 46 preferably spherical such as steel balls, are carried loosely within openings 48 in the arm 38 for free rolling movement along the upper face of wall 12 transversely thereof.

Figure 4:
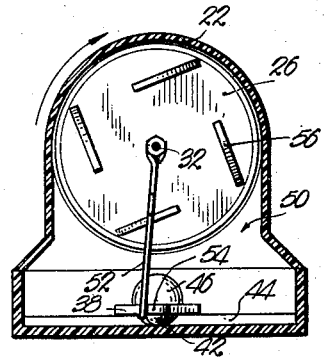
Fig. 4 is a transverse, cross-sectional view taken on line IV—IV of Fig. 2 looking in the direction of the arrows.
Figure 9:
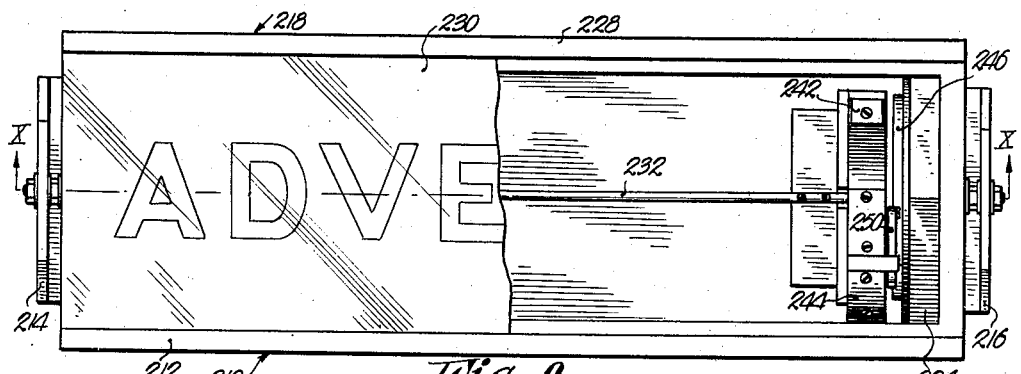
Fig. 9 is a plan view of another modified form of animated support made in accordance with the teachings of the present invention.
Figure 10:
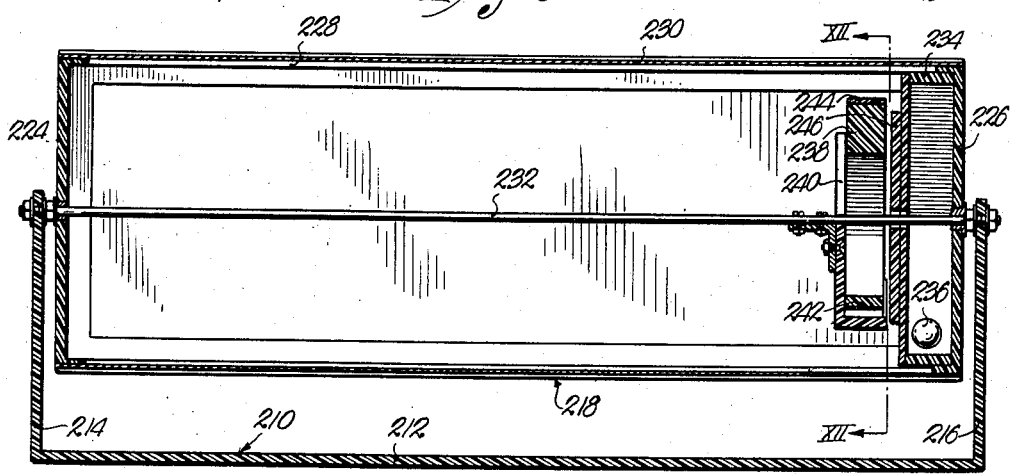
Fig. 10 is a longitudinal, vertical, cross-sectional view taken on line X—X of Fig. 9.
Figure 11:
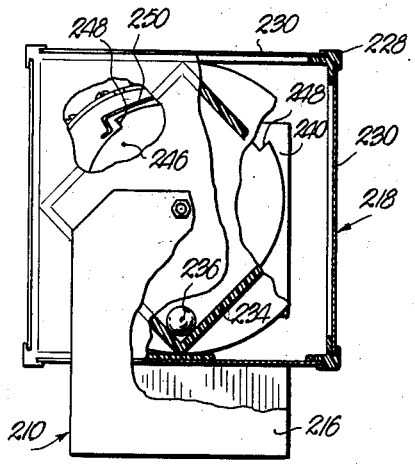
Fig. 11 is an end, elevational view of the animated support of Fig. 9, parts being broken away and in section to reveal details of construction.
Figure 12:
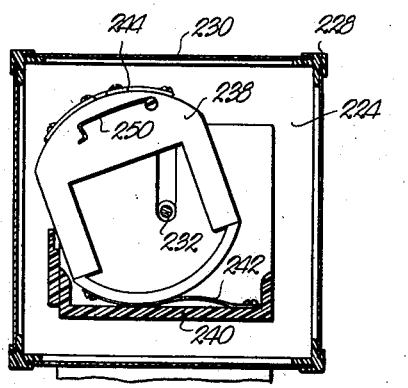
Fig. 12 is a transverse, vertical, cross-sectional view taken on line XII—XII of Fig. 10.

Ratchet means forming an operable interconnection between arm 38 and carrier 18 is housed within a chamber 50 adjacent the end wall 16 and includes a pawl member 52 freely swingable on shaft 32 between walls 16 and 26 and engageable by the projection 54 on arm 38. The ratchet interconnection also includes a plurality of substantially triangular-shaped ears or ratchet teeth or lugs 56, rigidly secured to the outermost face of the end wall 26 and arranged in a substantially circular pattern concentric to the axis of shaft 32, as best seen in Fig. 4.

Since, in the illustrated embodiment of cage 34 which is shown as substantially square, there is provided four corners, there is accordingly included four notches 28 to receive a like number of cards 30 and four corresponding lugs or ears 56.

The form of my invention shown in Figs. 1 to 4 inclusive may be mounted upon any suitable object that tends to move either constant or periodically. By way of example, it is suggested that the same be attached in an appropriate location to a taxicab therewithin or perhaps exteriorly thereof at the rear end of the taxicab or along either of its sides. Similarly, the support 10 might well be mounted within or on a bus or on a truck. A wide variety of other objects have sufficient movement to automatically actuate the advertising device of Figs. 1 to 4 inclusive and it is even conceivable that sufficient vibration is inherent in cash registers under normal use such as to cause proper movement of arm 38 and, therefore, carrier 18.

In operation, when the support 10 is moved by the object upon which it is mounted and particularly when the bottom wall 12 is either rocked, swung or shaken with some degree of shock, the inertia elements 46 will roll back and forth along the bottom wall 12 transversely thereof. Manifestly, such rolling movement of the elements 46 will impart swinging movement to the arm 38 about the axis of pintle 40. Such swinging movement of arm 38 in turn imparts swinging movement to the pawl 52 about the axis of shaft 32 upon which it is mounted. Each time pawl 52 swings in one direction, in engages a proximal lug 56, causing the drum 22 to rotate in one direction, and ecah time the pawl 52 swings in the opposite direction, it clears the proximal lug 56 and attains a new stand-by position for subsequent step-by-step rotative action in the cylinder 22.

A full 90° turn is not imparted to the cylinder 22 by the action of pawl 52 on lugs 56, but, as soon as rotative motion in the cylinder 22 is commenced, the spherical element 36 will commence rolling from one corner of cage 34 to the next successive corner thereof. Spherical element 36 thereupon takes over and completes the quarter revolution of the cylinder 22, thereby exposing to view a corresponding advertising card 30.

The weight 36 in addition to cooperating with the aforesaid ratchet mechanism within the chamber 50 in causing step-by-step rotation of the carrier 18, tends to hold the carrier 18 against constant movement by virtue of vibration or movement of the object upon which the support 10 is mounted and until such movement is sufficient to cause the elements 46 to move as above described.

Support 110 in the embodiment of my invention shown in Figs. 5 to 8 inclusive, is essentially the same as support 10 above-described, except only that the compartment 20 is eliminated, but there is provided a chamber 150 in the same manner at one end of rotatable carrier 118. Carrier 118 is likewise similar to carrier 18 but there is shown a plurality of longitudinal dividers 129 separating advertising cards 130 within cylinder 122.

A single inertia element 146 is provided in the chamber 150 for rolling movement on bottom wall 112 transversely of the latter, to impart initial step-by-step rotative advancement to the cylinder 122.

The operable connection between the steel ball 146 and the carrier 118 differs slightly from the ratchet mechanism above described. There is provided a disc 153 within the chamber 150 rigid to shaft 132 for carrier 118, which shaft 132 is likewise rigid to the carrier 118.

A plurality of substantially Z-shaped cranks 152 within the chamber 150 and between the disc 153 and end wall 126 for cylinder 122, are provided with inwardly extending legs 155 pivotally mounted in the end wall 126 and outwardly extending legs 157 within the path of travel of the element 146. As seen in Fig 8 of the drawings, the legs 155 are arranged in a circular pattern concentrically around the shaft 132. The legs 157 on the other hand, are spaced from the periphery of disc 153.

The cranks 152 are retained in place by the disc 153 and the latter is provided with a plurality of pins 159 extending inwardly toward the end wall 126.

There are four cranks 152 corresponding to the four corners of cage 134 and the four advertising cards 130, but there are twice as many pins 159 located as shown in Fig. 8 in a circular pattern adjacent the periphery of the disc 153.

The modification of Figs. 5 to 8 inclusive operate essentially the same as the form of the invention shown in Figs. 1 to 4 inclusive. As the spherical element 146 moves from right to left, viewing Fig. 8, it will come into contact with leg 157 of a crank 152, swinging the latter against a proximal pin 159 and imparting partial clock-wise rotation to the carrier 118 (viewing Figs. 7 and 8) until spherical element 136 continues the 90° rotation of the carrier 118 by moving from one corner of the cage 134 to the next adjacent corner. Upon movement of the element 146 from the dotted line position shown in Fig. 8, to the right and back to the full line position illustrated by Fig. 8, it will clear the leg 157 within its path of return movement because of the free swinging movement of the cranks 152 between the pins 159.

In the modified form of the present invention illustrated in Figs. 9–12, the same principles of operation are involved. A support broadly designated by the numeral 210 includes a bottom wall 212 and a pair of end walls 214 and 216. End walls 214—216 mount a carrier 218 which has polygonal end walls 224 and 226. The end walls 224—226 are joined at each corresponding corner by an elongated bar 228 having channel means thereon for receiving and advertising card 230 between each pair of adjoining bars 228. A central shaft 232 extends longitudinally of carrier 218, through end walls 224—226 of carrier 218, and is attached at each end thereof to an end wall 214 or 216 of support 210.

Figure 2:
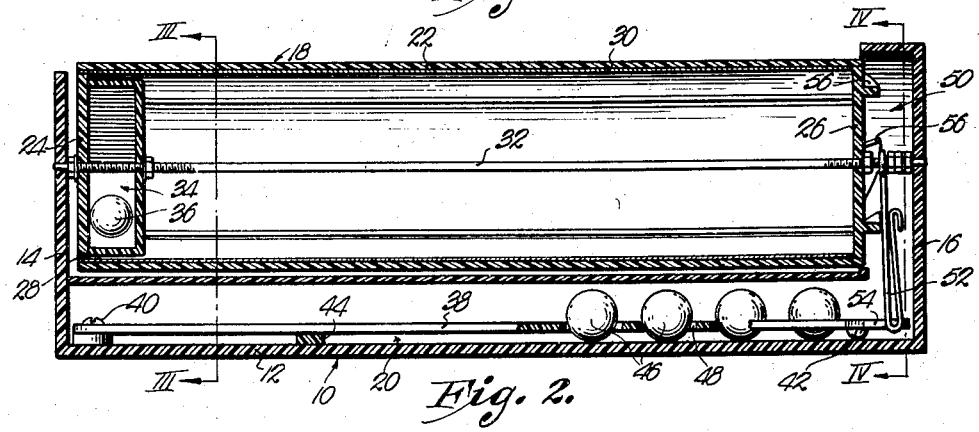
Fig. 2 is a longitudinal, vertical, cross-sectional view taken substantially on line II—II of Fig. 1.
Figure 3:
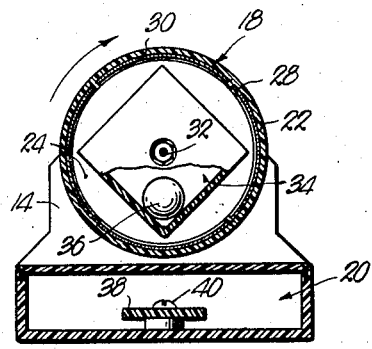
Fig. 3 is a transverse, cross-sectional view taken on line III—III of Fig. 2 looking in the direction of the arrows.

A polygonal cage 234 within carrier 218 adjacent end wall 226 thereof receives a steel ball 236 which, like the ball 36 of Figs. 2 and 3, rolls from corner to corner of cage 234 each time the support is moved sufficiently to actuate an associated inertia element.

It is to be noted that the carrier 218 and cage 234 rotate as a unit on shaft 232, rather than with the shaft as in the embodiments previously described.

The inertia element illustrated in Figs. 9–12, comprises a rocker element 238 mounted on a bracket 240 which, in turn is rigidly attached to shaft 232. A leaf spring 242 interconnects element 238 and bracket 240 and yieldably biases element 238 to the position of Fig. 12. Similarly, spring 242 limits rocking movement of element 238 in the opposite direction when the support is moved.

Element 238 carries stabilizing weights 244 on the upper most curvilinear edge thereof which weights cooperate with spring 242 to prevent chattering and minute oscillations of carrier 218, it being highly desirable that the latter remain stationary until sufficient change of inertia in support 210 causes a rotation of carrier 218 through the angle between adjacent bars 228.

On the inner face of cage 234, there is mounted a disc 246 which has shoulders 248 formed in the peripheral edge thereof, the shoulders 248 being angularly disposed intermediate each pair of bars 228. As element 238 rolls, a latch 250 thereon engages one of the shoulders 248 to impart rotation to disc 246 and carrier 218 (clockwise, viewing Figs. 11 and 12). As described above, ball 236 rolls to the next adjacent corner and thus completes one cycle. Manifestly, spring 242 returns element 238 to the normal position shown in Figs. 11 and 12.

It is obvious that the three embodiments herein disclosed are preferred forms only and that further changes and modifications may be made therein without departing from the broad principles of the instant disclosure. Such changes and modifications are contemplated hereby and it is, therefore, desired to be limited only by the scope of the appended claim.

Having thus described the invention what is claimed as new and desired to be secured by Letters Patent is:

In animated advertising structure, an elongated, normally horizontal support adapted to be mounted on a movable object; an elongated, tubular device rotatably mounted on the support in a horizontal position, said device being provided with end walls closing the same and having a polygonal cage therein surrounding the axis of rotation of the device; a spherical weight movably mounted in the cage for determining step-by-step rotation of the device as the weight moves to the corners of the cage; a spherical inertia element carried by the support adjacent one of said end walls and reciprocable on a path of travel perpendicular to the longitudinal axis of the device in response to movement of the support; a plurality of spaced pins extending outwardly from the outermost face of said one end wall and disposed radially with respect to the longitudinal axis of the device; and a plurality of substantially Z-shaped cranks having oppositely extending legs, one of the legs of each of the cranks being pivotally mounted on said one end wall between a pair of pins and located inwardly from the latter, the other legs of each of the cranks being within the path of travel of said element in a position so that as the element moves in said one direction and engages one of said other legs of one of the cranks, the latter bears against one of the pins to thereby rotate the device, said one crank clearing the pins as the element moves in said opposite direction to prevent retrograde rotation of the device.

References Cited in the file of this patent

UNITED STATES PATENTS

| | | |
|---|---|---|
| 150,364 | Sherman | Apr. 28, 1874 |
| 1,665,894 | Reichard | Apr. 10, 1928 |
| 2,144,002 | Wallace | Jan. 17, 1939 |

FOREIGN PATENTS

| | | |
|---|---|---|
| 17,713 | Great Britain | of 1910 |
| 247,992 | Great Britain | Aug. 19, 1926 |
| 464,411 | Italy | July 2, 1951 |